United States Patent [19]
Burroughs et al.

[11] 3,898,049
[45] Aug. 5, 1975

[54] HYDROGENATION REACTORS WITH IMPROVED FLOW DISTRIBUTION

[75] Inventors: James W. Burroughs, Beaumont; Robert L. Herbst, Groves; William C. Moyer, Port Arthur; Jesse M. Gray, Jr., Houston, all of Tex.

[73] Assignee: Texaco Inc., New York, N.Y.

[22] Filed: Nov. 14, 1973

[21] Appl. No.: 415,911

Related U.S. Application Data

[62] Division of Ser. No. 186,638, Oct. 5, 1971, abandoned.

[52] U.S. Cl. .............. 23/288 R; 208/57; 208/146; 23/288 A
[51] Int. Cl. .............. B01j 9/04; C10g 23/00
[58] Field of Search .......... 23/288 R, 288 A, 288 E; 208/57, 146

[56] References Cited
UNITED STATES PATENTS

| | | | |
|---|---|---|---|
| 1,036,610 | 8/1912 | Grosvenor | 23/288 E X |
| 2,127,561 | 8/1938 | Herrmann | 23/288 R |
| 2,472,254 | 6/1949 | Johnson | 23/288 R X |
| 2,835,560 | 5/1958 | Bason et al. | 23/288 R |
| 3,142,545 | 7/1964 | Raarup et al. | 23/288 R |
| 3,216,951 | 11/1965 | Erickson et al. | 23/285 X |
| 3,368,875 | 2/1968 | Tulleners | 23/288 E |
| 3,423,176 | 1/1969 | Kabisch et al. | 23/288 E X |
| 3,449,099 | 6/1969 | Taylor et al. | 23/288 R X |
| 3,484,214 | 12/1969 | Gehring et al. | 23/288 R |

Primary Examiner—Barry S. Richman
Attorney, Agent, or Firm—T. H. Whaley; C. G. Ries; Theron H. Nichols

[57] ABSTRACT

A hydrogenation reactor comprises an elongated vertical container with a height greater than twice the width and divided into a plurality of tall slender chambers, either as a new reactor or as a modified existing reactor, having greatly increased distribution of a fluid reactant mixture flowing through a solid catalyst. Vertical baffles divide the container into various novel configurations having an increased height-to-width ratio giving increased linear velocity of the flowing reactants to several times that of the single pass reactor while maintaining the space velocity constant, the baffles further providing high strength-to-weight ratio and greater distribution while still permitting easy loading, regeneration, and dumping of the catalyst. With the last chamber being a downflow chamber in all modifications, catalyst "carry over" is minimized. Most of the modifications have an even number of chambers with inlet and exit nozzles at the bottoms of both the first chamber and last chamber insuring more efficient reverse flow at any time.

3 Claims, 14 Drawing Figures

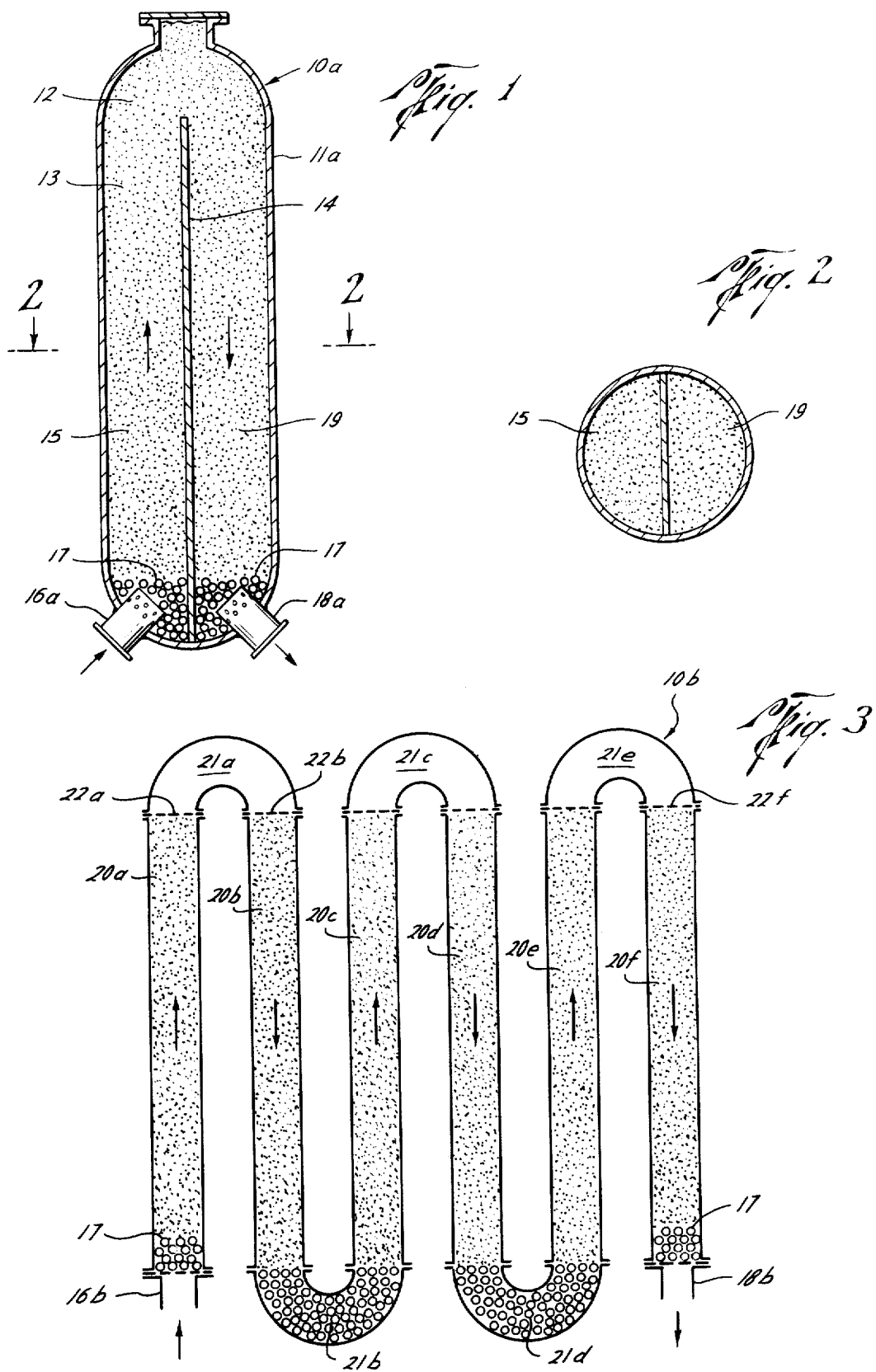

PATENTED AUG 5 1975  3,898,049

SHEET 2

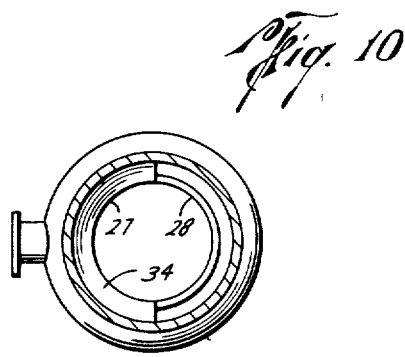
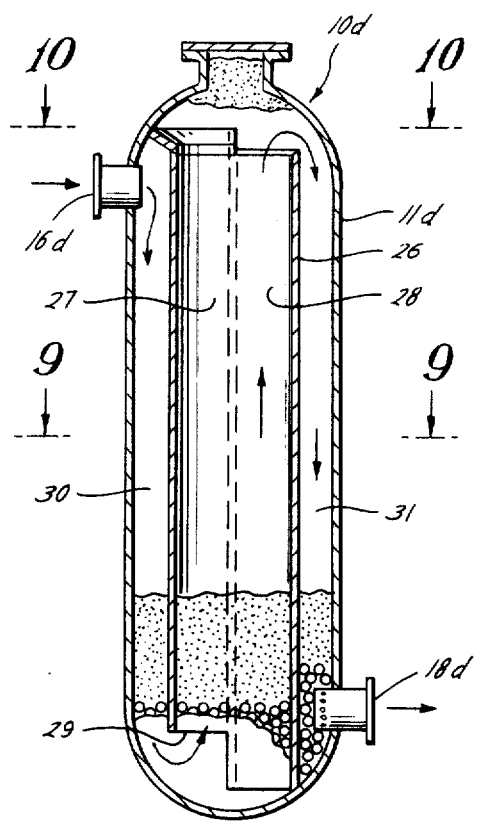
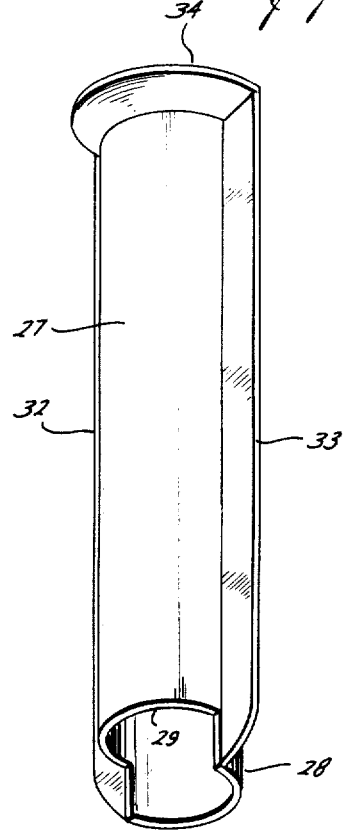
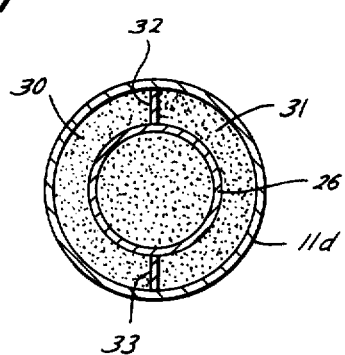

PATENTED AUG 5 1975　　　　　　　　　　　　　　　　3,898,049

SHEET 4

3,898,049

1

HYDROGENATION REACTORS WITH IMPROVED FLOW DISTRIBUTION

This is a division of application Ser. No. 186,638, filed Oct. 5, 1971, now abandoned.

OBJECTS OF THE INVENTION

A primary object of this invention is to provide a hydrogenation reactor having a fluid reactant mixture with a solid catalyst that provides increased distribution of the fluid reactant mixture flowing through the solid catalyst.

Another primary object of this invention is to provide a hydrogenation reactor that has a height of over twice the width resulting in greatly increased distribution of a solid catalyst in a liquid reactant, produces greater contact between the liquid reactant and the catalyst, and channelizing is prevented.

Another object of this invention is to provide a hydrogenation reactor which has increased distribution while still permitting easy loading, regeneration, and dumping of the catalyst.

A further object of this invention is to provide a hydrogenation reactor which may be modified with baffles for increasing the distribution of the fluid reactant mixture and yet increase the strength-to-weight ratio.

A still further object of this invention is to provide a hydrogenation reactor which has an efficient reverse flow operation at any time.

Another object of this invention is to provide a hydrogenation reactor that provides increased linear velocity while maintaining a constant space velocity.

Yet another object of this invention is to provide a hydrogenation reactor that is easy to operate and is of simple configuration and economical to form and assemble.

Other objects and various advantages of the disclosed hydrogenation reactor with improved flow distribution will be apparent from the following detailed description together with the accompanying drawings, submitted for purposes of illustration only and not intended to define the scope of invention, reference being had for that purpose to the subjoined claims.

BRIEF DESCRIPTION OF THE DRAWINGS

The drawings diagrammatically illustrate by way of example, not by way of limitation, several forms of the invention wherein like reference numerals designate corresponding parts in the several views in which:

FIG. 1 illustrates schematically one modification of the invention, with parts in section for clarity of disclosure, comprising a vertical elongated container having one baffle therein;

FIG. 2 is a section at 2—2 on FIG. 1;

FIG. 3 is a schematic sectional view of another elongated vertical chambered hydrogenation reactor;

FIG. 8 illustrates schematically a view of another modification of the reactor of FIG. 1 with another cylindrical baffle positioned inside an elongated cylindrical container, with parts illustrated in section;

FIG. 9 is a sectional view at 9—9 on FIG. 8;

2

Figure 12:
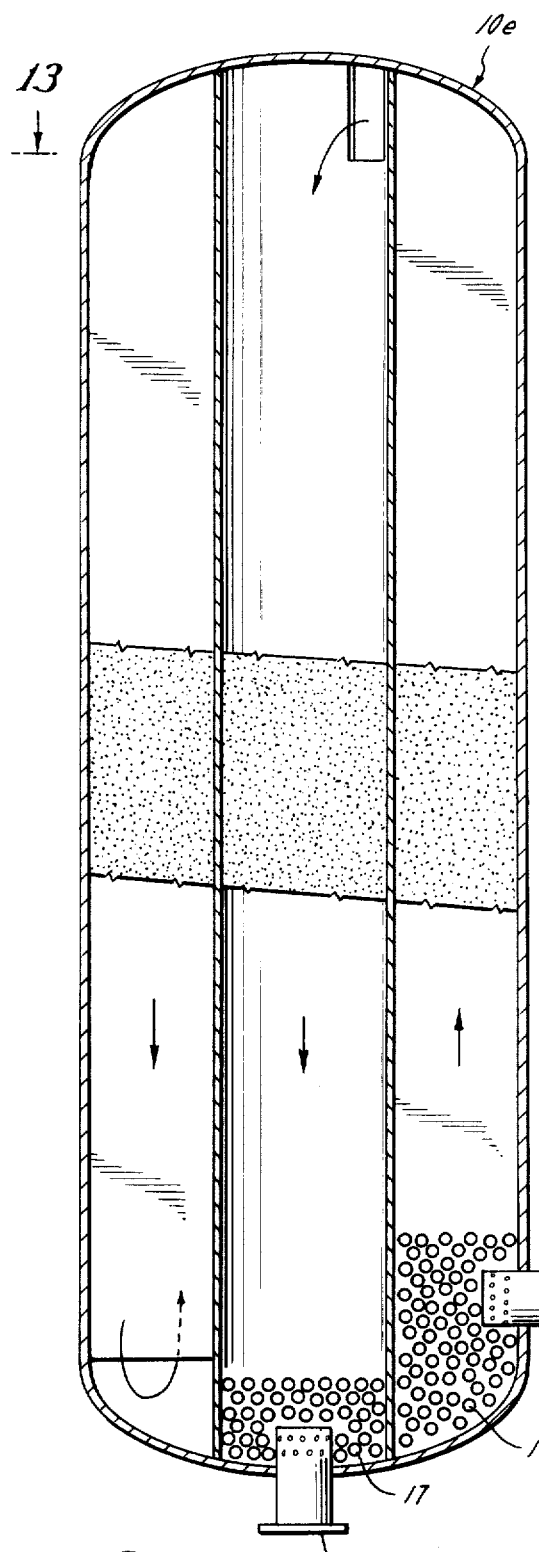
Figure 13:
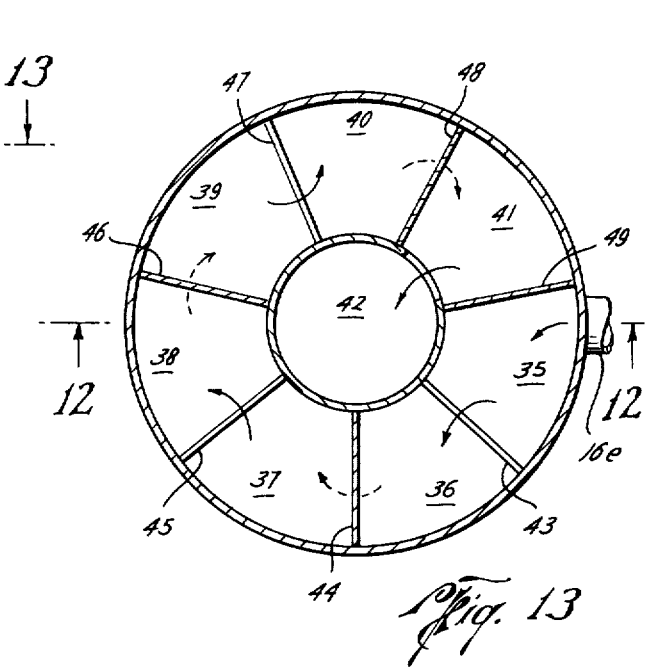

FIG. 10 is a sectional view at 10—10 on FIG. 8;

FIG. 11 is a perspective view of the inner cylindrical chamber of FIG. 8 with parts removed for clarity of disclosure;

FIG. 12 is a schematic sectional view of another modification of the hydrogenation reactor of FIG. 1;

FIG. 13 is a sectional view at 13—13 on FIG. 12; and

Figure 14:
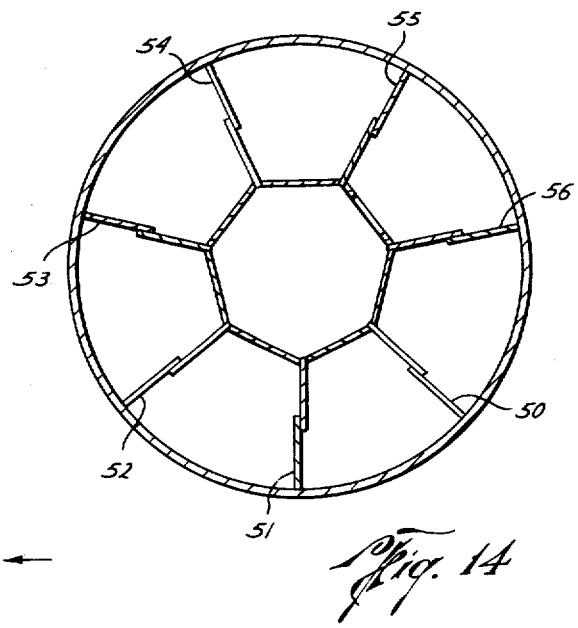

FIG. 14 is a modification of FIG. 13.

DESCRIPTION OF THE PREFERRED EMBODIMENTS

The invention disclosed herein the scope of which being defined in the appended claims is not limited in its application to the details of construction and arrangement of parts shown and described, since the invention is capable of other embodiments and of being practiced or carried out in various other ways. Also it is to be understood that the phraseology and terminology employed herein is for the purpose of description and not of limitation.

FIG. 1 shows an improved liquid distribution in a hydrogenation reactor 10a, the reactor container configuration 11a which allows a combination of upflow and downflow operation of a fluid reactant mixture 12, as a charge oil and hydrogen flowing through a mass of solid catalyst pellets 13 as illustrated. These pellets may be of any shape and size, such as but not limited to, cylindrical pellets from 1/16 inch to 1 inch in length. This reactor 10 is bisected with an elongated vertical baffle 14. The baffle has a fluid tight connection with the bottom of the container 11a forming a first elongated vertical chamber 15 with an inlet nozzle 16a in the bottom and to one side of the baffle, the nozzle having a perforated cover or a screen (not shown) and being covered with a layer of mullite balls 17 or slag which acts as a filter and retains the catalyst in the reactor. The fluid reactant 12 comprising hydrogen with components in oil and catalyst 13 mixture fill the cylindrical container 11 on both sides of the baffle 14. An outlet nozzle 18a is positioned on the other side of the baffle from the inlet nozzle 16a at the bottom of the second chamber 19 formed by dividing vertical baffle. Likewise, outlet nozzle 18a is covered with a perforated cover or screen (not shown) and a layer of mullite balls 17 or slag that acts as a filter or catalyst retainer. While only one baffle is illustrated and described in this embodiment, a plurality of baffles may be utilized if so required for increased distribution of the fluid reactants. This baffle or these baffles provide at least two-pass flow, or more, in the reactor.

Another critical feature of this reactor is that the height of the total container 11 is over twice the width or diameter of the container. Thus, in operation charge oil and hydrogen enter at the bottom of the first chamber 15 of the reactor flow upward and over the baffle 14 and then downward to the outlet 18 on the opposite side of the baffle. This results in greatly increased distribution of the catalyst in the reactants, provides greater contact between the liquid reactant and the solid catalyst, and prevents channelizing.

This modification of the reactor improves liquid distribution in two ways: (1) the liquid distribution is optimum on the upflow side, since this side of the reactor should have a continuous liquid phase with a minimum of channelizing, and (2) liquid distribution is improved on the downflow side since the cross section flow area is one-half or more that of the normal reactor.

The catalyst 13 is filled to the top of the reactor to minimize agitation due to upflow operation. Some catalyst attrition is inherent in upflow operation and can result in excessive catalyst carry over; however, the novel configuration of the modified reactor provides upflow followed by downflow operation which permits the catalyst in the downflow side to act as a filter for the catalyst from the upflow chamber. Accordingly an optimum liquid distribution results in the upflow chamber with less catalyst carry over from the reactor than from a reactor with only upflow operation.

The symmetrical design of the reactor permits efficient reverse flow operation at any time. This feature allows efficient operations to be quickly restored in the event of pressure drop buildup or channelizing in the downflow chamber.

Preferably, the vertical elongated container and baffle are formed of an alloy or is alloy-lined to protect them from hydrogen attack.

In addition to the above advantages, contacting in the reactor bed is improved, since linear velocity in the bed is doubled, at least, and catalyst carry over is no greater than for normal downflow of reactors.

FIG. 2, a sectional view on FIG. 1, illustrates how the baffle divides the overall container into two chambers 15 and 19.

FIG. 3 illustrates another embodiment 10b comprising an even number of elongated vertical chambers 20a to 20f. These chambers are serially interconnected with passage means 21a to 21e for each respective pair of adjacent chambers. The first chamber 20a has its inlet nozzle 16b at the bottom of chamber 20a and the last chamber 20f has its exit nozzle 18b at the bottom of chamber 20f which like most of the other modifications disclosed provides efficient reverse flow at any time. The first chamber 20a has a passage 21a at the top thereof turning through 180° to connect to the top of the second chamber 20b. The second chamber 20b has a passage 21b at its bottom to connect, after turning 180°, to the third slender elongated vertical chamber 20c. Chambers 20c and 20d are interconnected at the tops of each with a passage 21c and chambers 20d and 20e are interconnected at their bottoms with a 180° angled passage 21d. The last two chambers illustrated, chambers 20e and 20 f, are interconnected at the tops of each with a passage 21e thereby allowing outflow at the exit nozzle 18b at the bottom of the last passage 21f. The number of elongated vertical passages is preferably an even number in order to provide an upflow chamber as the first chamber and a downflow chamber as the last chamber to insure efficient reverse flow at any time without loss of catalyst.

Filter-screens 22a to 22f are provided at the top of each U-bend angle to prevent catalyst movement or carry over from one vertical chamber to the next. Catalyst fills all the vertical chambers. Filters such as ceramic balls 17 are positioned at the inlet and outlet and in angled passages 21b and 21d for forming filter-screens and for improved flow distribution in the hydrogenation reactor. Each of the elongated serially interconnected vertical chambers is spaced from the others for increased cooling therebetween.

Figure 4:
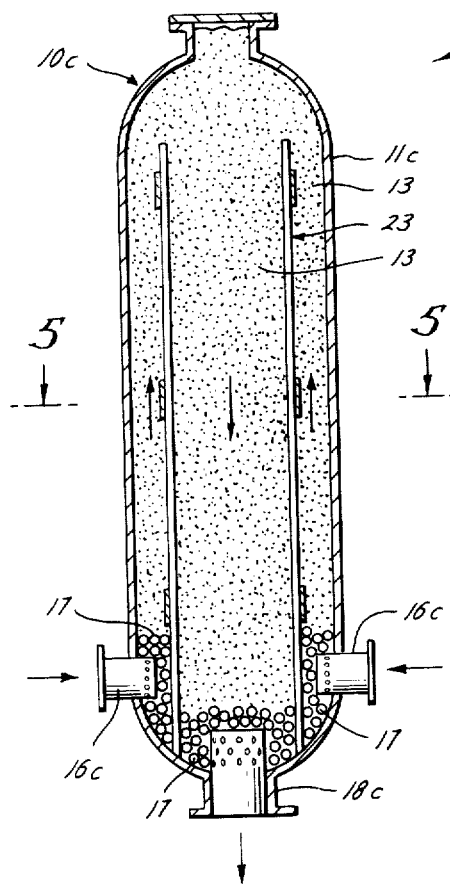
FIG. 4 illustrates schematically a sectional view of another modification of the reactor of FIG. 1.
Figure 5:
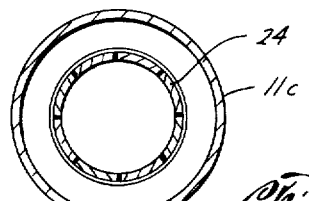
FIG. 5 is a section at 5—5 of FIG. 4.

FIGS. 4-7 illustrate another modification of the invention. FIG. 5, a cross sectional view of the modified reactor 10c of FIG. 4, illustrates an elongated vertical outer housing forming a container 11c with an elongated vertical tube inside thereof forming inner chamber 23 which is coaxial and concentric therewith outer annular chamber 11c. The inner chamber 23 is connected at the bottom to the outer container 11c, and secured around the periphery thereof are one or more inlet nozzles 16c. Likewise, filters 17 are positioned around the inlets. A catalyst 13 fills the two containers. An exit nozzle 18c is positioned in the bottom of inner container 23 with filter 17 thereover for preventing outflow of the catalyst with the reactants. In the center of this modified reactor at the bottom is the exit nozzle 18c with filter 17 therewith.

In operation, fluid reactants enter at the bottom and flow around the outer peripheral annular chamber 11c, over the top of the inner chamber, and down the inside cylindrical chamber 23 to flow out the exit nozzle 18c. This inner chamber 23 may be a prefabricated cylinder formed of staves 24 which may be dismantled, and then reassembled inside the reactor and pulled together with circumscribing straps 25. While only two inlet nozzles are illustrated, a multiplicity of inlet nozzles may be positioned around the peripheral of the outer annular chamber. The plurality of inlet nozzles provides uniform distribution of the charge entry. For reverse flow operation the feed is introduced into the bottom of the central chamber so that flow would be upward through the cylindrical chamber and downward through the annular outer chamber. While the cross sectional area of the outer and inner chambers may be equal, likewise they may also be varied to optimize flow distribution.

Catalyst is filled to the top of the reactor to minimize agitation of catalyst due to upflow operations.

FIG. 5 a sectional view of FIG. 4 illustrates the relative area of the two chambers.

Figure 6:
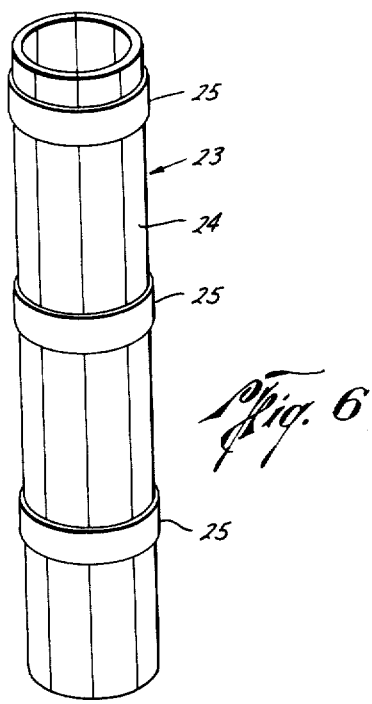
FIG. 6 is a perspective view, schematically illustrated, of the inner chamber of the reactor of FIG. 4.

FIG. 6 illustrates the inner cylindrical chamber 23 as being formed of staves 24 which are reassembled and secured with the straps 25 inside the outer chamber.

Figure 7:
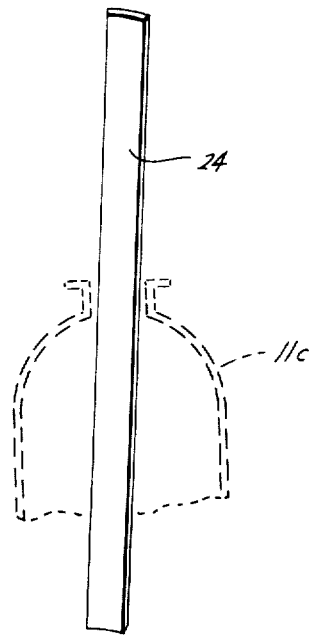
FIG. 7 is a schematic view showing the assembly of the cylindrical chamber of FIG. 6.

FIG. 7 illustrates the assembly of the inner cylindrical chamber comprising the insertion of staves 24 internally of the outer chamber 11c.

FIGS. 8-11 illustrate another modification of the reactor 10d which provides the advantages of increasing the linear velocity of the flowing medium in the reactor to several times that of the single pass reactor of a given diameter. Space velocity (volume of oil per hour per volume of linear catalyst) would remain unchanged. In this reactor, formed basically of an elongated vertical container 11d having a height greater than twice the width or diameter includes an inner cylinder 26, for forming a cylindrical inner chamber, the cylinder being attached to the bottom of the outer container 11d. The inner cylinder 26 as shown in FIGS. 8, 10 and 11, comprises two semicylindrical walls 27 and 28, and has an opening 29 in wall 27.

With cylinder 26 concentrically positioned inside of container 11d, FIG. 8, an annulus is formed therebetween. This annulus is cut into two semiannular chambers 30 and 31 by vertical plates 32 and 33, FIG. 11, extending from cylinder 26 at the joint between walls 27 and 28 to the walls of the container 11d, FIG. 10, and by arcuate plate 34, FIG. 11, extending from the top edges of wall 27 and the flat plates 32 and 33 to the container 11d, FIG. 8. A suitable catalyst fills all chambers.

Thus in operation, flow of the reactant passes from inlet 16d down through semiannular chamber 30, through opening 29, up through cylinder 26 and over into the semiannular chamber 31, down the chamber and out the bottom exit nozzle 18d.

The embodiment of FIG. 9 is easy to design and install. In this modification which comprises only three chambers, the inner sectional area of the cylindrical chamber is one-third the total area whereby the other two semiannular chambers are one-third each in area. The advantages of this modification are: (1) vertical baffling is relatively simple and inexpensive in increasing the height-to-diameter ratio of the reactor; (2) the flat plates support the inner cylindrical section and thereby strengthen the overall structure of the reactor; (3) the flow of oil and hydrogen through the reactor can be reversed during the operation at any time; (4) all sections can be regenerated in the regular manner and the catalyst may be dumped through nozzles in the bottom; and (5) the internal baffles may be made from low alloy steel and accordingly would not need to be alloy clad.

FIGS. 12 to 14 disclose another embodiment of the hydrogenation reactor 10e, FIG. 12, which like all embodiments except that of FIG. 8, includes an even number of chambers. These chambers are elongated and vertical, and like all other modifications, have a height over twice the width. This reactor 10e comprises an odd number of chambers around a central cylindrical chamber. In the exemplementary illustration seven chambers 35 to 41, FIG. 13, are formed around one cylindrical chamber 42 whereby the inlet nozzle 16e is formed in the bottom of the first chamber 35 which is one of seven around the periphery of the inner chamber 42. Each pair of adjacent chambers is interconnected with the passages. The first chamber 35 being an upflow chamber has its outlet and passage at the top which connects with its adjacent chamber 36 at its top, this second chamber being a downflow chamber. The second and third adjacent chambers 36 and 37, respectively, are interconnected at the bottoms thereof. The next two chambers, 37 and 38, the third and fourth chambers, are interconnected at the top thereof whereby with an odd number of peripheral chambers around the periphery of inner chamber 42 the last or add numbered chamber, the seventh or chamber 41 in this case is an upflow chamber. This last upflow chamber 41 is connected with a passage at its top to the top of the center and last downflow chamber 42, whereby flow passes out of the bottom of the chamber and out of the exit nozzle 18e therein. Both entrance and exit nozzles have a filter 17 thereover as illustrated by the mullite balls.

While the chambers illustrated in FIG. 13 have straight solid adjacent walls 43 to 49 therebetween, the walls 50 to 56 illustrated in the FIG. 14 embodiment are made up of two walls each joined at their adjacent edges. In this arrangement the seven elongated vertical chambers form the annular space around the center heptagonal chamber. All chambers have an equal cross sectional area. With the first and last chamber being formed as an upflow and downflow chamber, respectively, reverse flow through the reactor may be efficiently accomplished and whenever desired; catalyst carry over is minimized since the last chamber is always a downfall chamber. The baffles are either welded or bolted into position.

Likewise, these modifications provide increased linear velocity with improved distribution of the flowing stream throughout the reactor catalyst bed and therefore provide an improved and more efficient reactor in terms of oil throughput, i.e., throughput rate and total throughput (barrels of oil per pound of catalyst). Likewise the quality of the hydrogen treated oil is improved with respect to initial color, color stability, thermal, and oxidation stability.

While only a few embodiments of the invention have been shown in the accompanying drawings, it will be evident that various other modifications are possible in the arrangement and construction of the hydrogenation reactor with improved fluid distribution, without departing from the scope of the invention.

We claim:

1. A hydrogenation reactor having a liquid passing through a catalyst comprising,
   a. a vertical elongated closed cylindrical container having upper and lower ends for containing a catalyst therein,
   b. a smaller imperforate cylinder mounted coaxially internally of said elongated cylindrical container forming a closed annulus around said smaller cylinder, said smaller cylinder forming a centrally located cylindrical chamber,
   c. an odd number of and at least seven imperforate vertical walls extending radially between and interconnecting said two coaxial cylinders for dividing the elongated cylindrical container into a plurality and an odd number of at least seven peripheral elongated vertical chambers circumscribing the center cylindrical chamber to form an annulus of chambers around the center cylindrical chamber, each chamber having upper and lower ends,
   d. each of said chambers having a retaining means in the bottom thereof and being at least partially filled with a catalyst, said retaining means preventing the movement of the catalyst out of the bottom of each chamber,
   e. an inlet in one side of the container adjacent said container lower end in the first of said elongated vertical chambers for providing a flowing stream of the liquid into the bottom of said first chamber,
   f. an outlet in said lower end of the center cylindrical elongated vertical chamber for providing an exit of the liquid after passing through the catalyst, and
   g. passage means comprising openings in the tops of the first, third, and fifth and subsequent odd-numbered, excluding the last such odd-numbered, vertical walls, openings in the bottoms of the second, fourth, and sixth and subsequent even-numbered vertical walls, and an opening in the top of the small cylinder between the vertical walls forming the last peripheral chamber for serially interconnecting all of said chambers for providing an improved reactor having better contact between the liquid and catalyst by providing a multiple pass reactor with greater hydrogenation efficiency for a given volume of catalyst, with less channeling, and with less carryover and lost catalyst during both normal operation and reverse flow.

2. A hydrogenation reactor having a fluid reactant mixture with a catalyst comprising,
   a. an upright closed cylindrical housing,
   b. a smaller imperforate cylinder mounted coaxially internally of said cylindrical housing forming a closed annulus around said smaller cylinder, said smaller cylinder forming a centrally located cylindrical enclosure, c. an odd number and at least seven imperforate vertical walls extending radially between and interconnecting said two coaxial cylinders for forming a plurality and an even number of at least eight elongated vertical enclosures, each enclosure having upper and lower ends, d. said enclosures consisting of an odd number of at least seven peripheral enclosures encircling the center cylindrical enclosure to form an annulus of enclosures around the last and center cylindrical enclosure, e. each of said enclosures having a filtering means in the bottom thereof and being at least partially filled with a catalyst, said filtering means likewise forming catalyst retainers for preventing the movement of the catalyst out of the bottom of each enclosure, f. an inlet nozzle connected to the bottom of a first of said peripheral enclosures for supplying the fluid reactant mixture to the bottom of said first enclosure and an exit nozzle connected to the bottom of said center cylindrical enclosure for exit of the fluid reactant, and g. passage means comprising openings in the tops of the first, third, and fifth and subsequent odd-numbered, excluding the last such odd-numbered, vertical walls, openings in the bottoms of the second, fourth, and sixth and subsequent even-numbered vertical walls, and an opening in the top of the small cylinder between the vertical walls forming the last peripheral enclosure for serially interconnecting all of said vertical peripheral enclosures in series with said center cylindrical enclosure for forming an improved reactor having improved contact between the fluid reactant mixture and the catalyst by providing a multiple pass reactor with greater hydrogenation efficiency for a given volume of catalyst, with less channeling, and with less carryover of catalyst from one enclosure to another during both normal operation and reverse flow.

3. A hydrogenation reactor having a fluid reactant mixture with a solid catalyst comprising, a. an upright closed cylindrical housing, b. a small imperforate cylinder mounted coaxially internally of said cylindrical housing forming a closed annulus around said smaller cylinder, said smaller cylinder forming a centrally located cylindrical chamber, c. an odd number of and at least seven imperforate vertical walls extending radially between and interconnecting said two coaxial cylinders for forming a plurality and an odd number of at least seven elongated vertical peripheral chambers circumscribing the cylindrical chamber, each chamber having upper and lower ends, d. said chambers consisting of an odd number of at least seven peripheral chambers encircling the center cylindrical chamber to form an annulus of chambers around the center cylindrical chamber, e. each of said chambers having a retaining means in the bottom thereof and being at least partially filled with a catalyst, said retaining means preventing the movement of the catalyst out of the bottom of each chamber, f. an inlet in the lower end of the first of said elongated vertical peripheral chambers for supplying the fluid reactant mixture to the bottom of said first chamber, g. an outlet nozzle in the lower end of the center cylindrical elongated vertical chamber, and h. passage means comprising openings in the tops of the first, third, and fifth and subsequent odd-numbered, excluding the last such odd-numbered, vertical walls, openings in the bottoms of the second, fourth, and sixth and subsequent even-numbered vertical walls, and an opening in the top of the small cylinder between the vertical walls forming the last peripheral chamber for serially interconnecting all of said chambers for forming an efficient reactor that efficaciously provides improved contact between said fluid reactant mixture and said catalyst by providing a multiple pass reactor with greater hydrogenation efficiency for a given volume of catalyst, with less channeling, and with less carryover of catalyst from one chamber to the next during both normal operation and reverse flow.

* * * * *